United States Patent [19]

Aoki

[11] Patent Number: 4,920,514
[45] Date of Patent: Apr. 24, 1990

[54] OPERATIONAL INFORMATION DISPLAY SYSTEM

[75] Inventor: Shigeo Aoki, Inagi, Japan

[73] Assignee: Kabushiki Kaisha Toshiba, Kanagawa, Japan

[21] Appl. No.: 181,041

[22] Filed: Apr. 13, 1988

[30] Foreign Application Priority Data

Apr. 13, 1987 [JP] Japan .................................. 62-88638

[51] Int. Cl.$^5$ .......................... G06F 3/14; G06F 15/40
[52] U.S. Cl. .................................. 364/521; 340/723; 340/747; 364/518
[58] Field of Search ............... 364/518, 521, 522, 171, 364/188, 189, 191, 192, 200 MS File, 900 MS File; 340/703, 721, 723, 729, 747

[56] References Cited

U.S. PATENT DOCUMENTS

| | | | |
|---|---|---|---|
| 4,405,981 | 9/1983 | Yu et al. ............................. | 364/200 |
| 4,656,603 | 4/1987 | Dunn .................................. | 364/488 |
| 4,665,555 | 5/1987 | Alker et al. ...................... | 340/747 X |
| 4,677,427 | 6/1987 | Komatsu et al. ................... | 340/703 |
| 4,712,191 | 12/1987 | Penna .............................. | 364/521 X |
| 4,736,309 | 4/1988 | Johnson et al. .................... | 364/521 |
| 4,772,882 | 9/1988 | Mical ............................. | 364/521 X |
| 4,782,463 | 11/1988 | Sanders et al. ................. | 364/521 X |

Primary Examiner—Gary V. Harkcom
Assistant Examiner—H. R. Herndon
Attorney, Agent, or Firm—Finnegan, Henderson, Farabow, Garrett and Dunner

[57] ABSTRACT

The execution of a plurality of information processing functions are dependent on the previous execution of one or more required functions. A display for displaying input information includes a selective display unit for displaying a diagram of the sequential priority relationships between the plurality of functions. Each of the previously executed required functions is indicated on the diagram in the priority order upon which a desired processing function is dependent which reduces the time required for the sequential selection of a required function for execution of the desired processing function.

4 Claims, 9 Drawing Sheets

OPERATIONAL INFORMATION DISPLAY SYSTEM

BACKGROUND OF THE INVENTION

This invention relates to an information processing system, and, more particularly, to a system having a display unit for executing display and input of information.

When the input and display of information is executed in a conventional computer system (hereinafter referred to as "system") using a CRT display unit, a number of information processing function names provided by the system normally are displayed in menu form. There are many methods of selecting functions, such as by pointing to menu numbers or icons using a mouse input system. FIG. 1 illustrates an example of a menu display using an icon display for a medical ward management system. The respective function screens 12 are displayed on a CRT 11. In order to avoid displaying the menu screen every time a function is to be selected, function menu 14 is continuously displayed in the bottom section of CRT screen, even under any function screen display. Function menu 14 depends on an icon display 13 corresponding to each function, and the request for display of a relevant function screen is executed by pointing to a relevant place using a pointing device, such as a mouse.

When executing menu selection by a conventional method such as described above, each function can be freely selected on the CRT screen. However, in the actual system there are inter-relationships between each function. There are some functions which cannot be selected without first operating a preliminary stage of selecting another function, such as the setting of conditions or limiting the information search domain.

In FIG. 1, there are a total of eight functions and there are four functions which are essential aims (hereinafter referred to as "main functions"). Those are the four main functions of injection guidance, injection execution, patient information and file storage. The other four functions (input functions) are ones which have to be selected as preliminary stages (hereinafter referred to as "setting functions").

FIGS. 2 to 4 show which setting functions have to be selected first when operating each main function. FIG. 2 shows the case when operating the injection guidance function. In obtaining guidance on an injection, it is necessary to input a condition which indicates for which patient the guidance is to be obtained and, furthermore, a condition for who is giving the guidance. That is to say, when the "Injection Guidance" function is selected, the "Patient Name Input" function and "Doctor Name Input" function must have already been selected beforehand and each condition setting must have been executed.

FIG. 3 is an operation flow-chart for the injection execution function, which inputs the fact that an injection has been correctly executed based on the injection guidance of a doctor. In the same way as in FIG. 2, as a preliminary stage to operating the main function, since "Patient Name Input" is required and the main function is a function which is executed by a nurse, it is necessary to operate "Nurse Name Input" function beforehand for identifying which nurse will execute the operation.

FIG. 4 is an operation flow-chart for the "Patient Information" function for displaying patient information stored in the ward management system. In this case, the requirement for "Patient Name Input" is the same as in the above two examples. However, no authorization is needed from a doctor nor a nurse. Information on the responsible doctor or nurse may be input using the "Doctor Name Input" or the "Nurse Name Input".

FIG. 5 is an operation flow-chart for the storage functions for the various files in the ward maintenance system. This case differs from the above three examples in that it is executed by a system manager a clerk) who is not directly connected with the medical activities. That is to say, since this is not a function carried out specifically with a patient as a subject, the condition in which the main function can be selected is only a "Clerk Name Input" function which informs the system that the operator who is operating the system and selecting the main function is a system manager, who has the correct qualification.

As described above, the type of setting function which is preliminary to a main operation differs for every main function. When the selection of the function was left to the operator with only a display of conventional menu items, it was not clear at that time which function could be selected or which setting functions had already been executed. Therefore, this led to confusion when operating the system and wasted time.

SUMMARY OF THE INVENTION

It is an object of the present invention is to improve the operational efficiency of an information processing system.

Another object of the invention is to make it possible to easily recognize the relationships between the information processing functions of the system.

Additional objects and advantages will be obvious from the description which follows, or may be learned by practice of the invention.

The foregoing objects are achieved according to the present invention by providing an information processing system having a plurality of information processing functions, execution of some of the functions being dependent on previous execution of other functions in a sequential priority relationship, including a display unit for executing input and display of information The display unit includes a unit for selectively displaying the sequential priority relationships between the plurality of functions, a control unit for indicating on the display of the priority relationships each of the plurality of functions which has been previously executed and an input unit for sequentially selecting for execution of the previously unexpected functions in the displayed priority order upon which a desired function is dependent for reducing the time required for execution of the desired function.

DETAILED DESCRIPTION OF THE PREFERRED EMBODIMENTS

The following is an explanation of an embodiment of this invention with reference to drawings.

Figure 1:
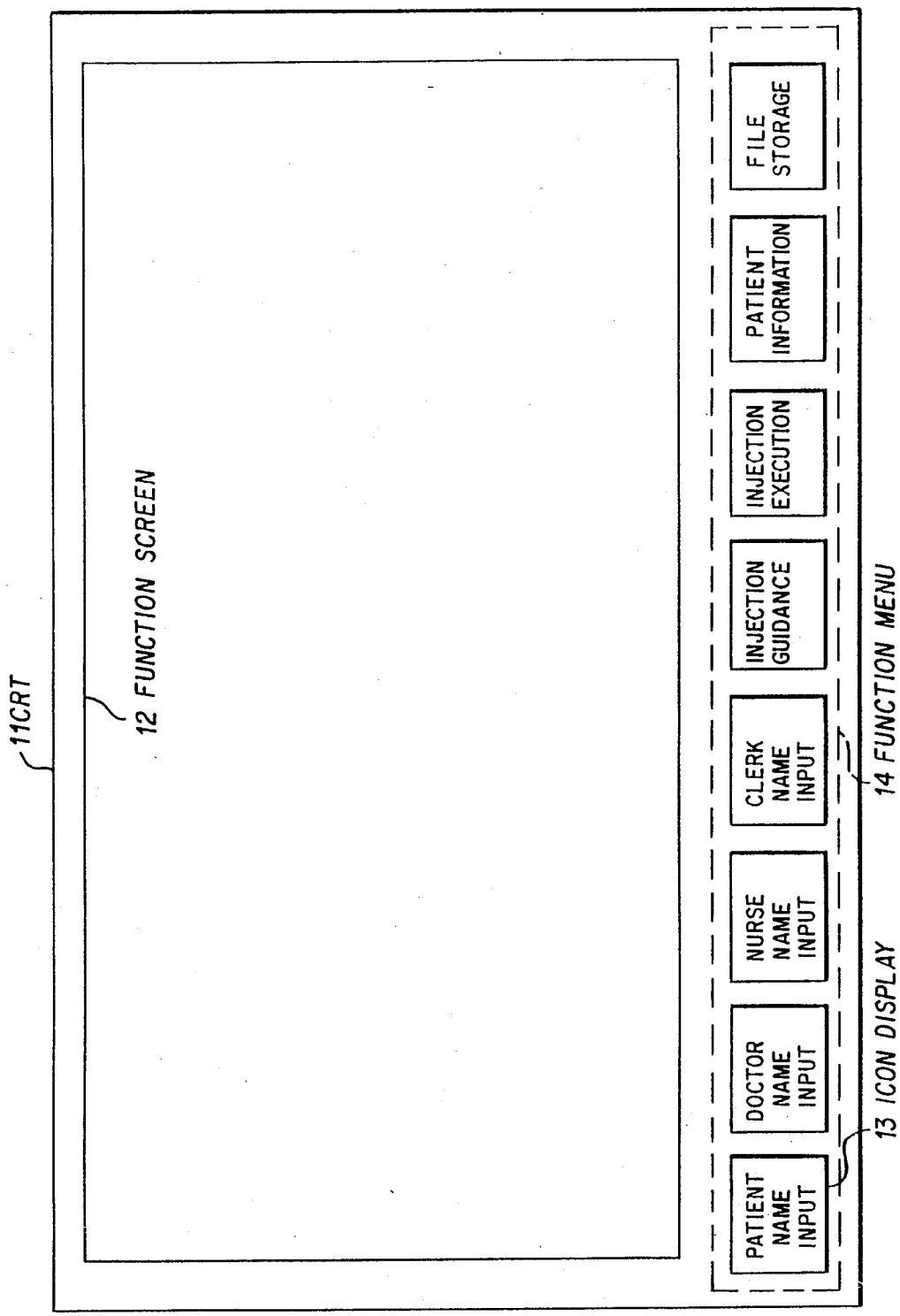
FIG. 1 is a display screen of a conventional display unit.
Figure 2:
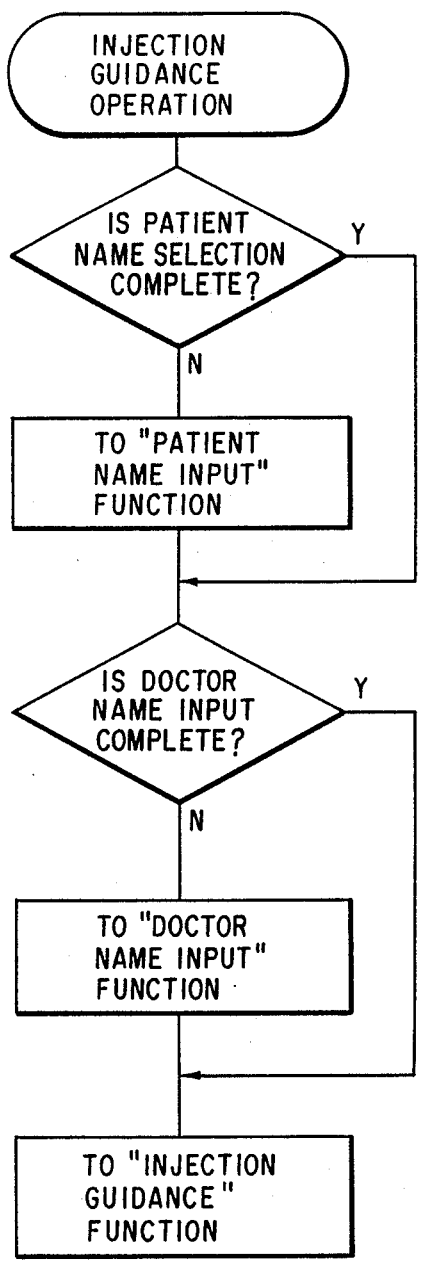
FIGS. 2 to 5 are operation flow-charts for main information processing functions in a general medical information processing system.
Figure 3:
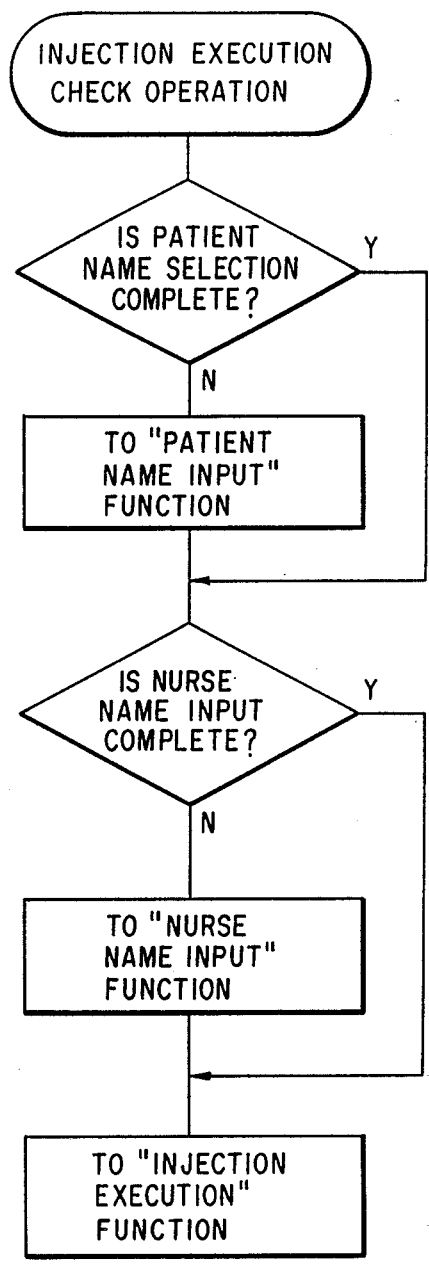
Figures 4, 5:
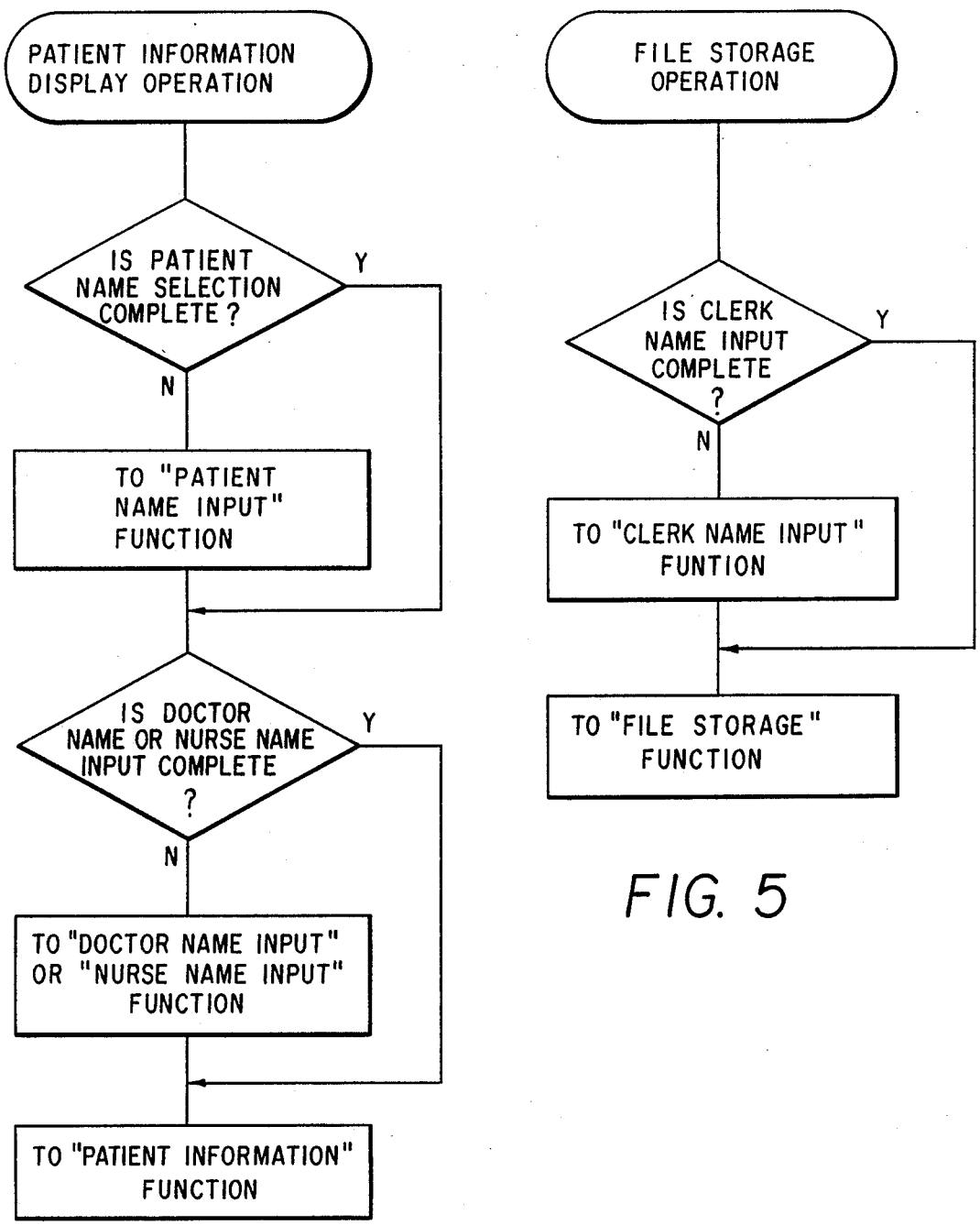
Figure 6:
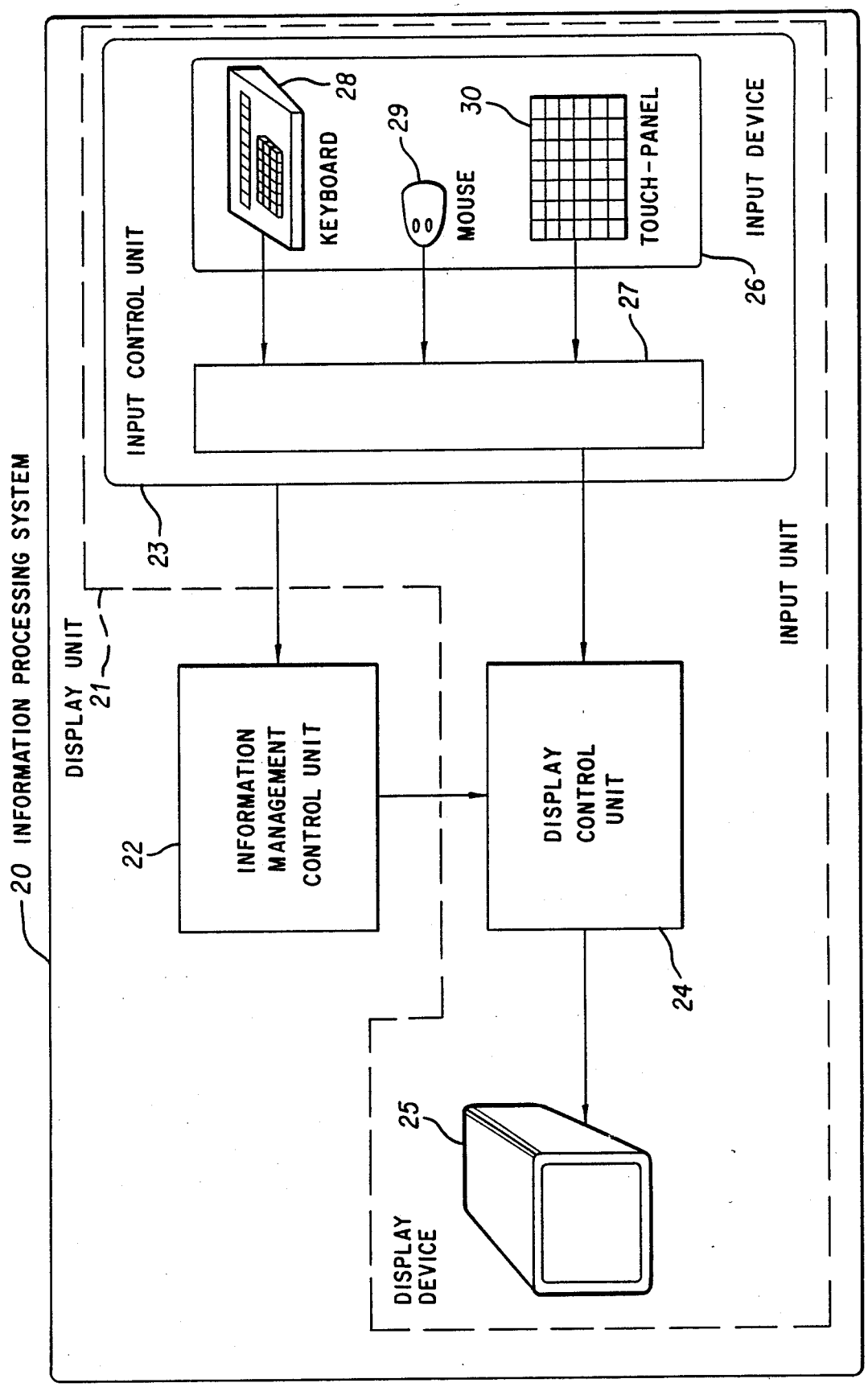
FIG. 6 is a block diagram of an information processing system according to the invention.

FIG. 6 is a block diagram showing an example of the construction of an information processing system according to this invention. An information processing system 20 includes a display unit 21 and an information management control unit 22. The display unit 21 includes an input unit 23, a display control unit 24 and a display device 25. The input unit 23 includes an input device 26 and an input control unit 27. The input device 26 is means for supplying input information to the information processing system 20, such as a keyboard 28, a mouse 29 and a touch-panel 30, and it is possible to use any one of, or a combination of, these devices.

The operations between each consituent element in FIG. 6 are explained. When selecting the display screen by a menu format, a operator inputs information corresponding to the respective functions thorogh the input device 26. In practice, when a input number, etc., corresponding to a function is determined, a relevant function number is inputted by the keyboard 28. Also, when there are icons corresponding to functions to be selected on the display screen, the information related to the selected function selection is supplied by selecting the relevant icon using the mouse 29 or the touch-panel 30.

The information related to the selected function is supplied to the input control unit 27 where it is judged that it is a function selection request, and this information is transmitted to the information management control unit 22. The Information management control unit 22 edits the necessary data on the relevant function screen display according to the function selection request, and transmits to the display control unit 24 a display request to the display device 25 for the relevant display data. The display control unit 24 receives the request from the information management control unit 22 and transmits the received display data to the display device 25. In this case, the display control unit 24 stores the conditions affecting the inter-relationships between functions of the display data from information management control unit 22. That is to say, it stores the relevant information on which functions are currently selected, and which functions have been set up or have been cancelled up to this time.

Next, concerning the operation of information processing system 20 when the operator uses a function and inputs data in the condition in which that function has already been selected, in the same way as in the case of the above-mentioned function selection, the data supplied by the input device 26 is judged as a data input by the input control unit 27 and the necessary data processing is executed by the information management control unit 22. When changing the content of the display screen, the display data are transmitted to the display control unit 24. The display control unit 24 transmits the relevant display data to the display device 25 which then displays the data. In this case, when there is an occurrence of fresh conditions affecting the inter-relationships between functions, that information is stored in the same way as in the case of function selection mentioned above.

Next, when displaying the screen which indicates the operational inter-relationships between functions, the operator, for instance, executed a special input through the input device 26 corresponding to the function system display. When this is a keyboard input, a special key allocated to that function is depressed. In the cases of mouse and touch-panel inputs, selection is possible by providing an icon on the display screen corresponding to the function and selecting that icon.

The function system display request is judged by the input control unit 27 to be a function system display request and not a function selection nor a data input request. This request is transmitted to the display control unit 24. The display control unit 24 receives the request and stores it when there is a function selection or data input request. It edits the information relating to the operational inter-relationships between functions and produces function system screen data which it transmits to the display device 25.

In the above description concerning the operation of the constituent elements of the information processing system 20, the display device 25 displays display data transmitted from the display control unit 24 on the display screen in every case.

Figure 7:
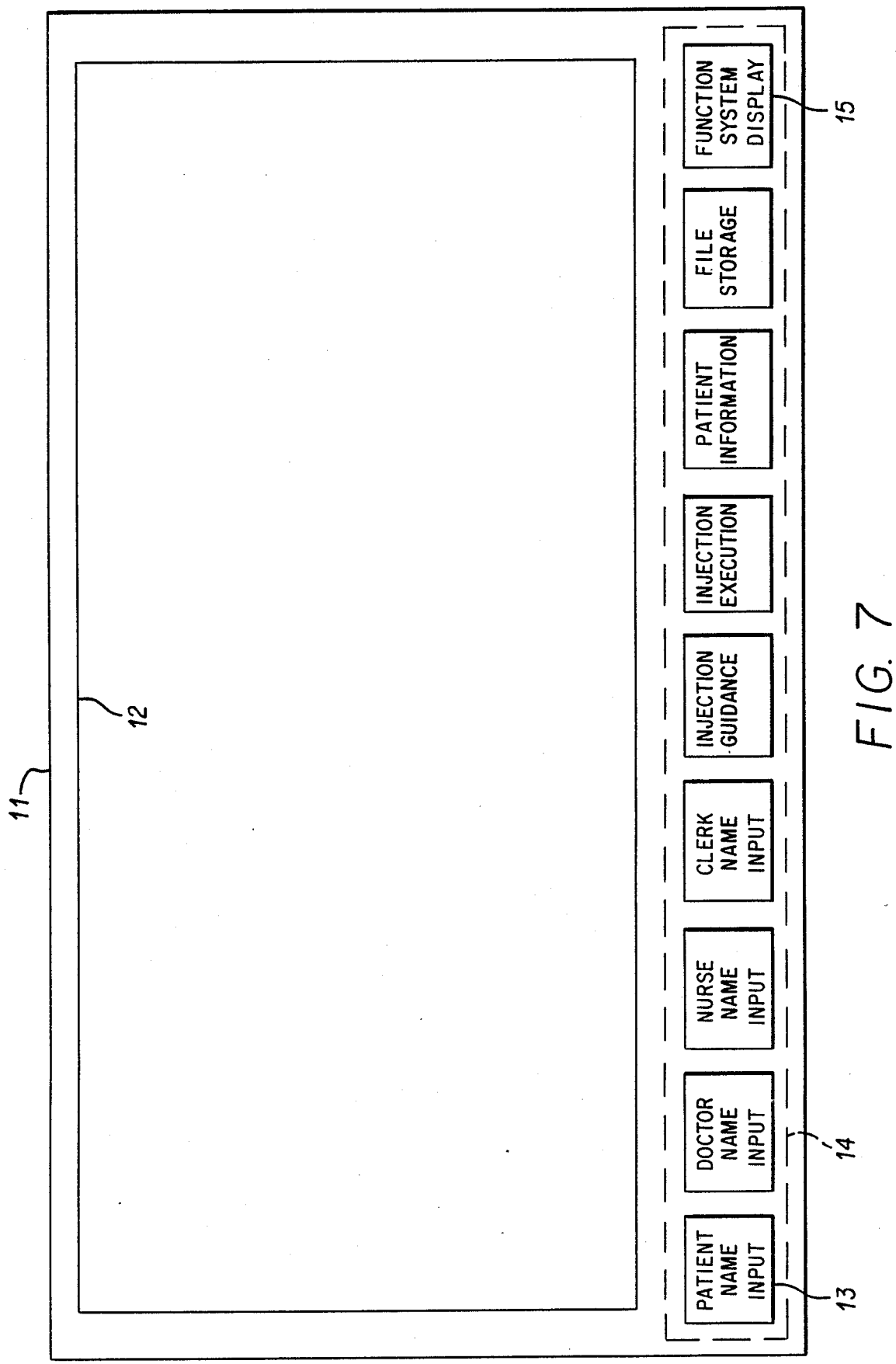
FIGS. 7 to 9 are the display screens of an information processing system according to the invention.

Next, when using a mouse or a touch-panel as the means of function selection, FIG. 7 shows an example of the screen display when icons for function selection are provided on the screen, and a practical example of the screen display is explained below.

Figure 8:
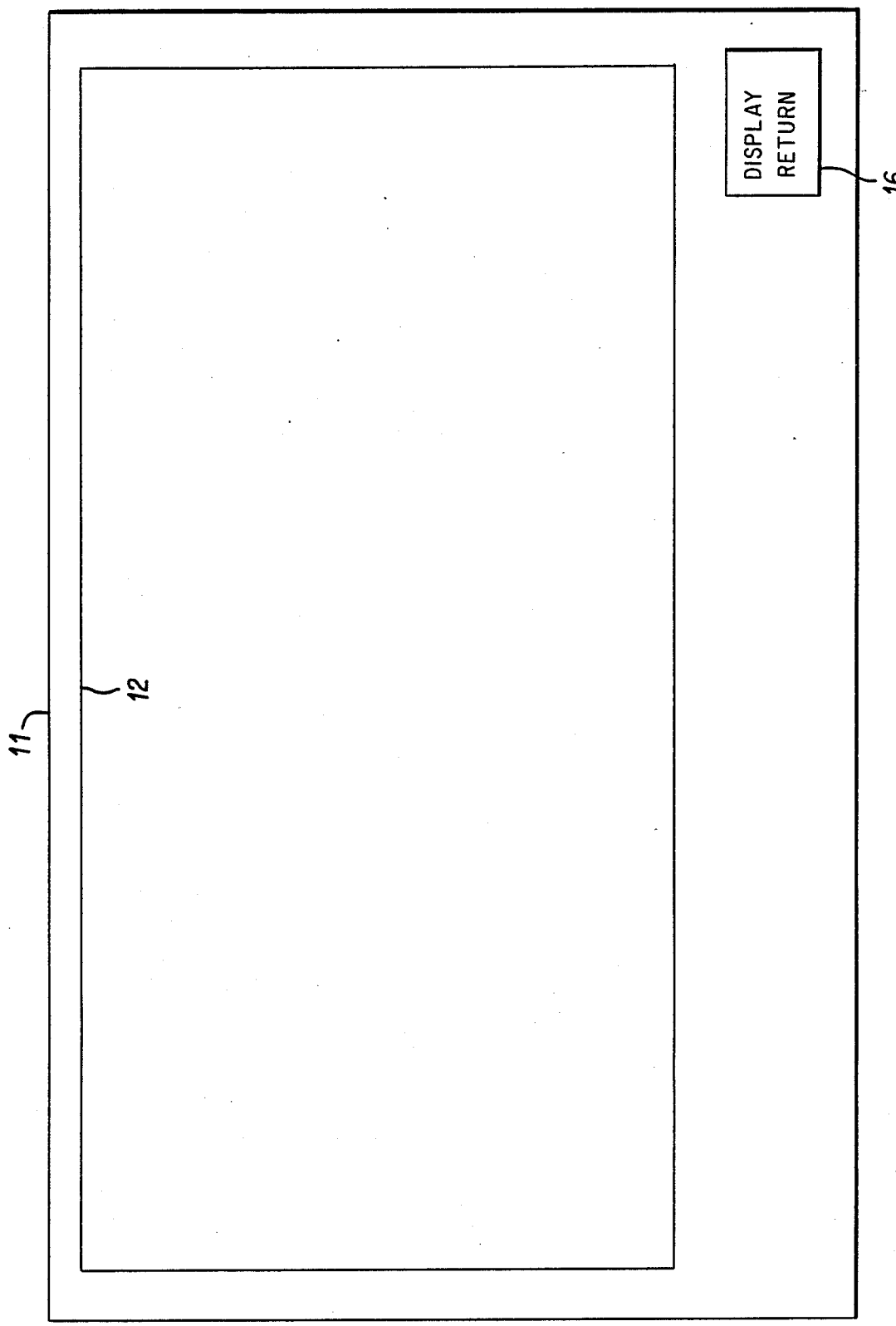

In FIG. 7, each function screen 12 is displayed on CRT screen 11. Icon display 13 for function selection is provided at the bottom of this screen in the same way as in prior art and, in function menu 14, icon 15 is provided for function system display. This icon 15 can be selected as desired, even when other function screens are being displayed. FIG. 8 shows the screen displayed by this function selection. At the bottom of the screen of CRT 11 there is icon display 16 for "Display Return". By pointing to this icon, the function screen being displayed before selecting the function can be returned.

Figure 9:
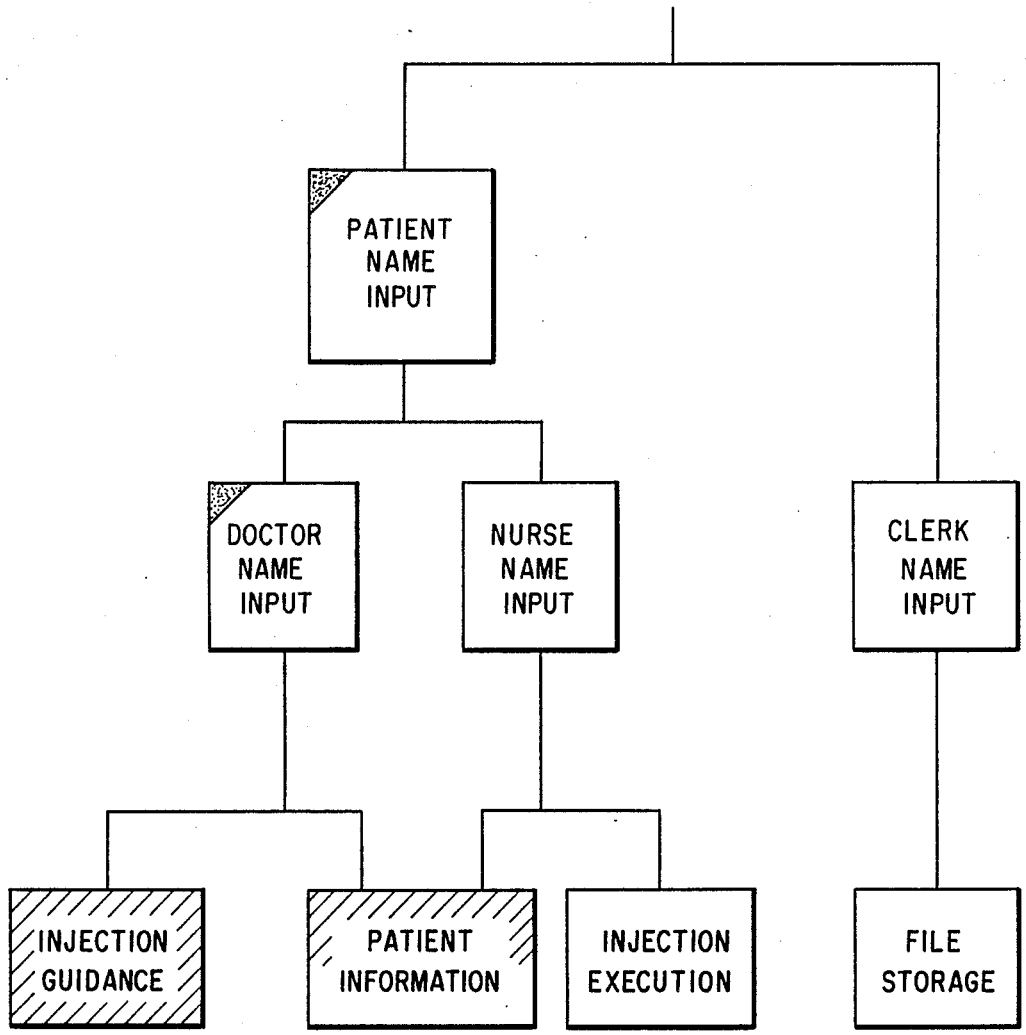

FIG. 9 shows a display example of a function screen 12 in FIG. 8. This corresponds to the operation flow-charts for each main function which are shown in FIGS. 1 to 4, and shows the inter-relationships between the main functions and the setting functions. For example, from this diagram, it can be seen that in order to operate the "Injection Execution" function, it is necessary to select the "Patient Name Input" function and the "Nurse Name Input" function. Furthermore, in this function screen, for the setting functions by which conditions have already been set and the function which is currently selected (immediately before selecting this function system display function), their positions and which other functions are selectable under the current setting conditions as they stand are shown by displaying colours or the like. In FIG. 9, diagonal shading of the whole area indicates the function currently selected; the function with black marks in their upper left corners are the set screens for which condition setting is already completed, and diagonal shading of the upper half shows main functions which can be selected with the current setting.

In the example shown in FIG. 9, it can be seen that, for the "Injection Guidance" function which is currently selected, the condition settings of "Patient Name Input" and "Doctor Name Input" have already been completed. Also, it can be seen that, since these conditions settings are completed, the "Patient Information"

function can be selected. Moreover, it can be seen at a glance that, since the setting of "Nurse Name Input" is first required in order to select the "Injection Execution" function, and also the selection operation of the "Clerk Input" function is a precondition for the "File Storage" function, neither of these functions can be directly selected.

Figure 10:
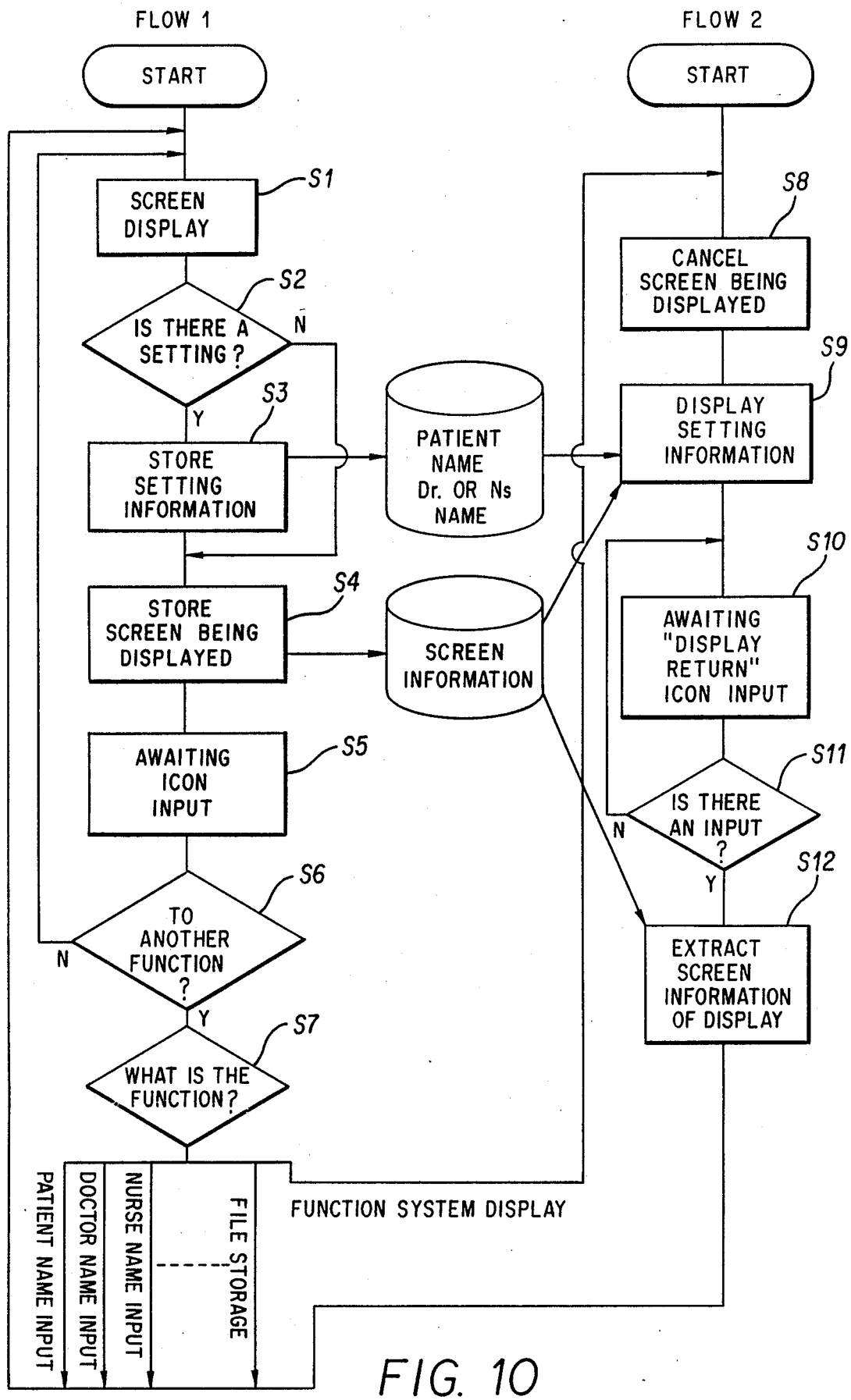
FIG. 10 is a flow-chart for showing operations of the invention.

FIG. 10 explains the software flows and data relationships which execute the functions shown in FIGS. 7 to 9.

In FIG. 10, Flow 1 is the flow-chart for "main functions" and "setting functions", and Flow 2 is the flow-chart for the function system display function.

In Flow 1, each function screen (12 in FIG. 7) is displayed (S1). If there is no special setting (S2), the necessary information for display, such as the screen data which is currently being displayed, or the screen number, is stored in files for every display (S4), and the flow next proceeds to icon input (S5). Judgement is made as to whether the icon input is designated within the same function or requires another function (S6), and if it is within the same function, display of a new screen within the same function is executed (S1). Here, in the case of setting functions, judgement is made whether this function has set patient name, doctor name, nurse name or clerk name (S2), and when a condition has been set, the condition set is stored in files (S3).

When shifting to another function, that is to say when an icon of menu display area 14 in FIG. 7 is selected, after judging to which function to shift (S7), the flow restarts from the screen display of the function to which the shift is made (S1).

Here, when the function system display function is selected (selection of icon 15 in FIG. 7), the flow shifts to Flow 2.

That is to say, the flow shifts to the function system display function and the screen currently being displayed is cancelled unconditionally (S8). After this, the screen in FIG. 9 is displayed based on setting information stored at S3 (S9).

That is to say, it can be judged from the stored data whether patient name, doctor name, nurse name and clerk name have already been set, and the screen is displayed by changing the display colours of the frames in FIG. 9 based on that judgement.

Also, when displaying the main functions which are in the bottom row of FIG. 9, it can be judged by a simple AND/OR from the information already set which function can be selected. For example, it can be judged whether or not the conditions for "Injection Guidance" have been satisfied by the AND of the conditions that patient name and doctor name have been selected.

Moreover, the type of screen currently being displayed (to be precise, the screen being displayed before the request for screen system display), can be judged from the screen information stored in S4 of Flow 1.

From then on, after the screen in FIG. 9 has been displayed, the display return icon is awaited (S10), and if there is an input (S11), the screen information for the screen which had previously been displayed is extracted (S12), and the flow returns to Flow 1. Then a screen display (S1) may be executed in Flow 1 based on the information extracted in S12.

In this way, it is possible to achieve a function which provides for the arbitrary execution of the function system display during the operation of normal main functions and setting functions, and for the display of the current condition setting state and the functions which can be selected thereafter.

As described above, this function can be selected from any display screen in normal CRT operation and the operation system diagram shown in FIG. 9 will be displayed. Therefore, even if the operator cannot remember which is the current setting condition while shifting many times between various functions, the operator can be immediately freed from this confusion when operating by applying this functions.

Figure 11:
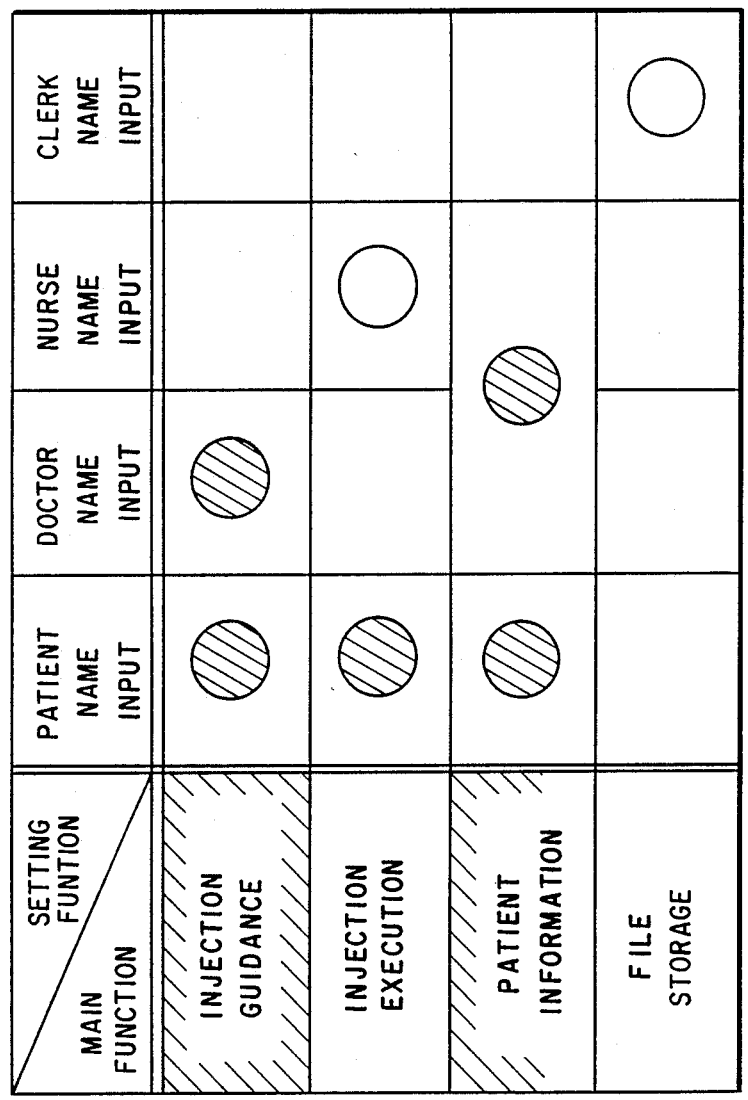
FIG. 11 is an another display screen according to the invention.

The same effect can be obtained even if the interrelationships between functions and the state of selection are shown by a table in matrix form instead of showing the operation system as a tree form as shown in FIG. 9. FIG. 11 shows in matrix form the same content as in FIG. 9 by dividing it into main functions and setting functions. Those setting conditions already set are shown by the shaded circles.

What is claimed is:

1. An operational information display system for a plurality of information processing functions, the execution of which are dependent on the previous execution of required functions in a sequential priority relationship, the system comprising:
    a display for displaying information input to the system;
    means for selectively displaying a diagram of the sequential priority relationship between the plurality of functions;
    control means for indicating, on the diagram the identity of each previously executed required function; and
    input means for sequentially selecting for execution any of said required functions in the displayed priority order upon which a desired processing function is dependent, for reducing the time required for execution of the desired processing function.

2. The system of claim 1, wherein the control means also includes means for identifying on the diagram the priority relationships of any of the plurality of processing functions for which all said required functions in the sequential priority relationship have been executed.

3. The system of claim 1, wherein the selective display means comprises matrix means for displaying in a matrix configuration a diagram of the sequential priority relationship between the plurality of functions, the matrix configuration diagram being composed of rows and column graphically identify the plurality of processing functions and the other required functions.

4. The system of claim 1, wherein the selective display means comprises tree means for displaying in a tree-like configuration a diagram of the sequential priority relationship between the plurality of functions, the tree-like diagram being composed of a plurality of defined areas and connected by lines.

* * * * *

UNITED STATES PATENT AND TRADEMARK OFFICE
CERTIFICATE OF CORRECTION

PATENT NO. :   4,920,514
DATED      :   April 24, 1990
INVENTOR(S):   Shigeo AOKI It is certified that error appears in the above-identified patent and that said Letters Patent is hereby corrected as shown below:

IN THE CLAIMS

Claim 3, Column 6, Line 55, change "identify" to
--identifying--.

Signed and Sealed this

Twenty-seventh Day of October, 1992

Attest:

DOUGLAS B. COMER

Attesting Officer    Acting Commissioner of Patents and Trademarks